United States Patent [19]

Gergen et al.

[11] Patent Number: 4,578,429

[45] Date of Patent: Mar. 25, 1986

[54] SELECTIVELY HYDROGENATED BLOCK COPOLYMERS MODIFIED WITH ACID COMPOUNDS OR DERIVATIVES

[75] Inventors: William P. Gergen, Houston; Robert G. Lutz, Spring; Richard Gelles, Houston, all of Tex.

[73] Assignee: Shell Oil Company, Houston, Tex.

[21] Appl. No.: 646,391

[22] Filed: Aug. 31, 1984

[51] Int. Cl.$^4$ .................. C08L 53/02; C08F 279/04
[52] U.S. Cl. ........................... 525/291; 525/285;
525/286; 525/274; 525/280; 525/287; 525/296;
525/301; 525/303; 525/310
[58] Field of Search ............... 525/301, 291, 310, 285

[56] References Cited

U.S. PATENT DOCUMENTS

| | | | |
|---|---|---|---|
| Re. 27,145 | 6/1971 | Jones | 260/880 |
| 3,639,517 | 2/1972 | Kitchen et al. | 260/879 |
| 4,007,311 | 2/1977 | Harlan | 525/310 |
| 4,033,888 | 7/1977 | Kiovsky | 525/285 |
| 4,077,893 | 3/1978 | Kiovsky | 525/301 |
| 4,292,414 | 9/1981 | Saito et al. | 525/255 |
| 4,427,828 | 1/1984 | Hergenrother et al. | 525/66 |

FOREIGN PATENT DOCUMENTS 0080443  5/1982  Japan .................. 525/285

*Primary Examiner*—Wilbert J. Briggs, Sr.
*Attorney, Agent, or Firm*—Peter A. Bielinski

[57] ABSTRACT

The present invention relates to a thermally stable modified selectively hydrogenated high 1,2 content block copolymer wherein at least one acid compound is grafted to the block copolymer at a secondary or tertiary carbon position.

30 Claims, No Drawings

SELECTIVELY HYDROGENATED BLOCK COPOLYMERS MODIFIED WITH ACID COMPOUNDS OR DERIVATIVES

This invention relates to novel selectively hydrogenated block copolymers functionalized with acid compounds. More particularly, it relates to a modified thermoplastic polymer with excellent appearance properties and mechanical properties particularly useful in blending with other polymers obtained by modifying a block copolymer composed of a conjugated diene compound and an aromatic vinyl compound with an acid compound or its derivative.

BACKGROUND OF THE INVENTION

This application is related to application Ser. Nos. 646,389 and 657,294 which have been filed concurrently herewith.

It is known that a block copolymer can be obtained by an anionic copolymerization of a conjugated diene compound and an aromatic vinyl compound by using an organic alkali metal initiator. These types of block copolymers are diversified in characteristics, ranging from rubber-like characteristics to resin-like characteristics, depending on the content of the aromatic vinyl compound.

When the content of the aromatic vinyl compound is small, the produced block copolymer is a so-called thermoplastic rubber. It is a very useful polymer which shows rubber elasticity in the unvulcanized state and is appliable for various uses such as moldings of shoe sole, etc.; impact modifier for polystyrene resins; adhesives; binder; etc.

The block copolymers with a high aromatic vinyl compound content, such as more than 70% by weight, provide a resin possessing both excellent impact resistance and transparency, and such a resin is widely used in the field of packaging. Many proposals have been made on processes for the preparation of these types of block copolymers (U.S. Pat. No. 3,639,517).

The elastomeric properties of certain aromatic vinyl polymers also appear to be due in part to their degree of branching. While the aromatic vinyl polymers have a basic straight carbon chain backbone, those with elastomeric properties always have dependent alkyl radicals. For example, EPR (ethylene-propylene rubber) has a structure of dependent methyl radicals which appears to provide elasticity and other elastomeric properties. When an essentially unbranched straight chain polymer is formed, such as some polyethylenes, the resulting polymer is essentially non-elastomeric or in the other words relatively rigid, and behaves like a typical thermoplastic without possessing rubber-like resilience or high elongation, tensile strength without yield, low set or other properties characteristic of desirable elastomers.

Block copolymers have been produced, see U.S. Pat. No. Re 27,145 which comprise primarily those having a general structure

A—B—A wherein the two terminal polymer blocks A comprise thermoplastc polymer blocks of vinylarenes such as polystyrene, while block B is a polymer block of a selectively hydrogenated conjugated diene. The proportion of the thermoplastic terminal blocks to the center elastomeric polymer block and the relative molecular weights of each of these blocks is balanced to obtain a rubber having an optimum combination of properties such that it behaves as a vulcanized rubber without requiring the actual step of vulcanization. Moreover, these block copolymers can be designed not only with this important advantage but also so as to be handled in thermoplastic forming equipment and are soluble in a variety of relatively low cost solvents.

While these block copolymers have a number of outstanding technical advantages, one of their principal limitations lies in their sensitivity to oxidation. This was due to their unsaturated character which can be minimized by hydrogenating the copolymer, especially in the center section comprising the polymeric diene block. Hydrogenation may be effected selectively as disclosed in U.S. Pat. No. Re 27,145. These polymers are hydrogenated block copolymers having a configuration, prior to hydrogenation, of A-B-A wherein each of the A's is an alkenyl-substituted aromatic hydrocarbon polymer block and B is a butadiene polymer block wherein 35–55 mol percent of the condensed butadiene units in the butadiene polymer block have 1,2configuration.

These selectively hydrogenated ABA block copolymers are deficient in many applications in which adhesion is required due to its hydrocarbon nature. Examples include the toughening and compatibilization of polar polymers such as the engineering thermoplastics, the adhesion to high energy substrates of hydrogenated block copolymer elastomer based adhesives, sealants and coatings, and the use of hydrogenated elastomer in reinforced polymer systems. However, the placement onto the block copolymer of functional groups which can provide interactions not possible with hydrocarbon polymers solves the adhesion problem and extends the range of applicability of this material.

Beyond the very dramatic improvement in interface adhesion in polymer blends, a functionalized S-EB-S component can also contribute substantially to the external adhesion characteristics often needed in polymer systems. These include adhesion to fibers and fillers which reinforce the polymer system; adhesion to substrates in adhesives, sealants, and coatings based on functionalized S-EB-S polymers, adhesion of decorations such as printing inks, paints, primers, and metals of systems based on S-EB-S polymers; participitation in chemical reactions such as binding proteins such as heparin for blood compatibility; surfactants in polar-nonpolar aqueous or non-aqueous dispersions.

Functionalized S-EB-S polymer can be described as basically commercially prodced S-EB-S polymers which are produced by hydrogenation of S-B-S polymer to which is chemically attached to either the styrene or the ethylene-butylene block, chemically functional moieties.

Many attempts have been made for the purpose of improving adhesiveness, green strength and other properties by modifying block copolymers with acid compound having high functionality, and various methods have been proposed for modifying synthetic conjugated diene rubbers with acid moieties.

Saito et al in U.S. Pat. No. 4,292,414 and U.S. Pat. No. 4,308,353 describe a monovinyl aryl/conjugated diene block copolymer with low 1,2 content grafted with a maleic acid compound. However, the process is limited to reaction conditions wherein the generation of free radicals is substantially inhibited by using free radical inhibitors or conventional stabilizers for example phenol type phosphorous type or amine type stabilizers. The processes are limited to thermal addition reactions or the so-called "ENE" reaction. This reaction scheme depends on unsaturation in the base polymer for reaction sites. A reasonable amount of residual unsaturation must be present in order to obtain an advantageous degree of functionality or grafting onto the base polymer. A substantially completely hydrogenated base polymer would not react appreciably in the Saito et al process.

Hergenrother et al in U.S. Pat. No. 4,427,828 described a similar modified block copolymer with high 1,2 content however, again produced by the 'ENE' reaction.

The 'ENE' process as described in the prior art results in a modified polymer product which is substituted at a position on the polymer backbone which is allylic to the double bond. The reaction can be shown for maleic anhydride as follows:

(a) to main chain unsaturation

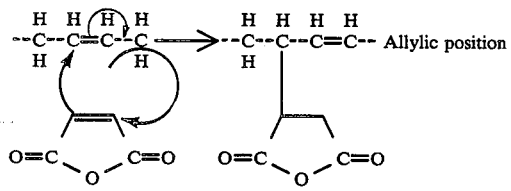

(b) to vinyl unsaturation

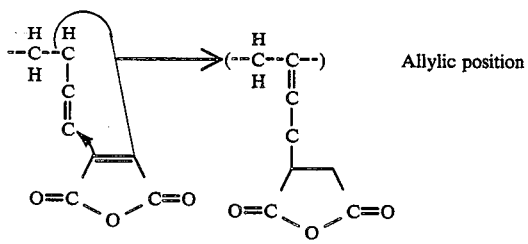

wherein (a) represents addition across a double bond in the main chain of the base polymer and (b) represents addition across a double bond occuring in a side chain. After addition and isomerization the substitution is positioned on a carbon allylic to the double bond.

The allylically substituted polymers are prone to thermal degradation due to their thermal instability. It is known in the art that allylic substituents can undergo what has been referred to as a contra-ENE reaction, see B. C. Trivedi, B. M. Culbertson, *Maleic Anhydride*, (Plenum Press, New York, 1982) pp. 172–173.

Further, because the ENE reaction requires a reasonable amount of unsaturation in the precursor base polymer, as discussed previously, the resulting functionalized copolymer product will have a significant amount of residual unsaturation and will be inherently unstable to oxidation.

SUMMARY OF THE INVENTION

According to the present invention, there is provided a thermally stable modified selectively hydrogenated high 1,2 content block copolymer wherein at least one acid compound is grafted to the block copolymer (base polymer) at a secondary or tertiary carbon position.

More preferably there is provided a functionalized selectively hydrogenated block copolymer selected from the group consisting of AB diblock copolymers and multiblock copolymers having at least two end blocks A and at least one mid block B to which has been grafted an acid compound or its derivative wherein, (1) each A is predominantly a polymerized monoalkenyl aromatic hydrocarbon block having an average molecular weight of about 2,000 to 115,000;
(2) each B is predominantly a polymerized conjugated diene hydrocarbon block having an average molecular weight of about 20,000 to 450,000;
(3) the blocks A constituting 5-95 weight percent of the copolymer;
(4) the unsaturation of the block B is reduced to less than 10% of the original unsaturation;
(5) the unsaturation of the A blocks is above 50% of the original unsaturation;
(6) and substantially all of the acid compounds or their derivatives are grafted to the block copolymer at secondary or tertiary carbon positions.

The feature of this invention lies not only in providing a process for the industrial production of modified block copolymers but also providing the modified block copolymers which are thermally stable; have a low residual unsaturation, are excellent in appearance characteristics, melt-flow characteristics, and mechanical properties such as tensile strength and impact resistance; transparency; etc.

The modified block copolymers according to the present invention are substituted at a secondary or tertiary carbon position as shown in the exemplary reactions shown below:

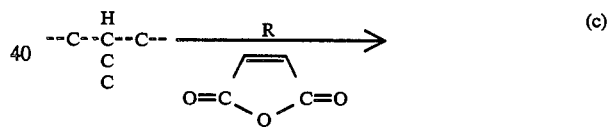

(c)

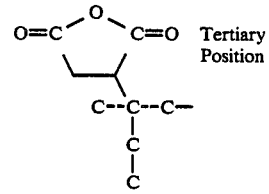

Tertiary Position

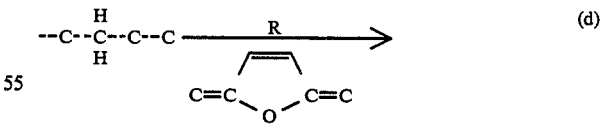

(d)

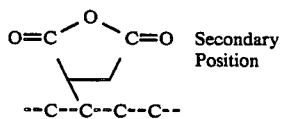

Secondary Position

The structure of the substituted block copolymer specifically determined by the location of the functionality on the polymer backbone at a secondary or tertiary position gives the block copolymer a substantially greater degree of thermal stability.

DETAILED DESCRIPTION OF THE INVENTION

Selectively Hydrogenated Block Copolymer

Block copolymers of conjugated dienes and vinyl aromatic hydrocarbons which may be utilized include any of those which exhibit elastomeric properties and those which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial symetric or asymetric and which have structures represented by the formulae; A-B, A-B-A, A-B-A-B, B-A, B-A-B, B-A-B-A, (AB)$_{0,1,2}$ . . . BA and the like wherein A is a polymer block of a vinyl aromatic hydrocarbon or a conjugated diene/vinyl aromatic hydrocarbon tapered copolymer block and B is a polymer block of a conjugated diene.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene(isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

Grafted Compounds

In general, any materials having the ability to react with the base polymer, in free radical initiated reactions are operable for the purposes of the invention.

In order to incorporate functional groups into the base polymer, monomers capable of reacting with the base polymer, for example, in solution or in the melt by free radical mechanism are necessary. Monomers may be polymerizable or nonpolymerizable, however, preferred monomers are nonpolymerizable or slowly polymerizing.

The monomers must be ethylenically unsaturated in order to take part in free radical reactions. We have found that by grafting unsaturated monomers which have a slow polymerization rate the resulting graft copolymers contain little or no homopolymer of the unsaturated monomer and contain only short grafted monomer chains which do not separate into separate domains.

The class of preferred monomers which will form graft polymers within the scope of the present invention have one or more functional groups or their derivatives such as carboxlyic acid groups and their salts, anhydrides, esters, imide groups, amide groups, acid chlorides and the like in addition to at least one point of unsaturation.

These functionalities can be subsequently reacted with other modifying materials to produce new functional groups. For example a graft of an acid-containing monomer could be suitably modified by esterifying the resulting acid groups in the graft with appropriate reaction with hydroxy-containing compounds of varying carbon atoms lengths. The reaction could take place simultaneously with the grafting or in a subsequent post modification reaction.

The grafted polymer will usually contain from 0.02 to 20, preferably 0.1 to 10, and most preferably 0.2 to 5 weight percent of grafted portion.

The block copolymers, as modified, can still be used for any purpose for which an unmodified material (base polymer) was formerly used. That is, they can be used for adhesives and sealants, or compounded and extruded and molded in any convenient manner.

The preferred modifying monomers are unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives from said acids.

Examples of such acids, anhydrides and derivatives thereof include maleic acid, fumaric acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, acrylonitrile, methacrylonitrile, sodium acrylate, calcium acrylate, and magnesium acrylate.

Other monomers which can be used either by themselves or in combination with one or more of the carboxylic acids or derivatives thereof include $C_2$–$C_{50}$ vinyl monomers such as acrylamide, acrylonitrile and monovinyl aromatic compounds, i.e. styrene, chlorostyrenes, bromostyrenes, $\alpha$-methyl styrene, vinyl pyridines and the like.

Other monomers which can be used are $C_4$ to $C_{50}$ vinyl esters, vinyl ethers and allyl esters, such as vinyl butyrate, vinyl laurate, vinyl stearate, vinyl adipate and the like, and monomers having two or more vinyl groups, such as divinyl benzene, ethylene dimethacrylate, triallyl phosphite, dialkylcyanurate and triallyl cyanurate.

The preferred monomers to be grafted to the block copolymers according to the present invention are maleic anhydride, maleic acid fumaric acid and their derivatives. It is well known in the art that these monomers do not polymerize easily.

Of course, mixtures of monomer can be also added so as to achieve graft copolymers in which the graft chains at least two different monomers therein (in addition to the base polymer monomers).

Preparation of the Polymers

The modified block copolymer according to the present invention may be prepared by graft-reacting an acid moiety or its derivative with an aromatic vinyl compound-conjugated diene compound block copolymer containing at least one polymer block AB mainly composed of a conjugated diene compound at least one polymer block BA mainly composed of an aromatic vinyl compound, wherein said graft reaction is carried out by melt-mixing said block copolymer and said acid moiety in the presence of a free radical initiator and wherein each A is a polymerized monoalkenyl aromatic hydrocarbon block having an average molecular weight of about 2,000 to 115,000; each B is a polymerized conjugated diene hydrocarbon block having an average molecular weight of about 20,000 to 450,000; the blocks A constitute 5–95 weight percent of the copolymer; 40–55 mol percent of the condensed butadiene units in block B have a 1,2-configuration; the unsaturation of the block B is reduced to less than 10% of the original unsaturation; and the unsaturation of the A blocks is above 50% of the original unsaturation.

This process has been described in copending application 646,389 which is hereby incorporated by reference.

The grafting reaction is initiated by a free-radical initiator which is preferably an organic peroxygen compound. Especially preferred peroxides are 2,5-dimethyl-2,5-di(t-butylperoxy)hexane, di-t-butyl peroxide, 2,5-dimethyl-2,5-di-tert-butylperoxy-3-hexyne (Lupersol 130), $\alpha,\alpha'$-bis(tert-butylperoxy)diisopropyl benzene (VulCup R), or any free radical initiator having a short half-life under the base polymer processing conditions. See pp. 66–67 of *Modern Plastics*, November 1971, which is incorporated hereby reference, for a more complete list of such compounds.

The concentration of the initiator used to prepare the modified polymer may vary between wide limits and is determined by the desired degree of functionality and degradation allowable. Typical concentrations range from about 0.001 weight percent to about 5.0 weight percent, more preferably between 0.01 and 1.0 weight percent.

Reaction Conditions

Reaction temperatures and pressures should be sufficient to melt the reactants and also sufficient to thermally decompose the free radical initiator to form the free radical. Reaction temperatures would depend on the base polymer being used and the free radical initiator being used. Typical reaction conditions can be obtained by using a screw type extruder to mix and melt the reactants and to heat the reactant mixture to the desired reaction temperature.

The temperatures useful in the reaction of the process of the present invention may vary between wide limits such as from +75° C. to 450° C., preferably from about 200° C. to about 300° C.

The process of the invention is highly flexible and a great many modifications such as those proposed above are available to carry out any particular purposes desired.

Of course, any of the standard additives can be used with these modified polymers. They include conventional heat stabilizers, slip-agents, antioxidants, antistatic agents, colorants, flame retardants, heat stabilizers, plasticizers, preservatives, processing aids and the like.

It is to be emphasized that in definition of the base polymer, substituted polymers are also included; thus, the backbone of the polymer before functionalization can be substituted with functional groups such as chlorine, hydroxy, carboxy, nitrile, ester, amine and the like.

Furthermore, polymers which have been functionalized, particularly those with functional carboxylic acid groups, can be additionally crosslinked in a conventional manner or by using metallic salts to obtain ionomeric crosslinking.

The present invention will be further illustrated by the following examples.

EXAMPLE

The base polymer used in the following examples was Kraton ® G-1652 Rubber, a commercial S-EB-S block copolymer. This polymer was melt reacted with maleic anhydride and 2,5-dimethyl-2,5-di(t-butylperoxy)hexane (Lupersol 101) in a 30 mm diameter corotating twin screw extruder.

The reactants were premixed by tumbling in polyethylene bags, and then fed into the extruder. For the examples, all extrusion conditions except for reactant concentrations were kept constant. The following two stage screw configuration was used: the first stage comprised a 6 mm spacer, a 75 mm feed section, eight mixing cams, and an orifice ring pair. The second stage was identical except for a feed section 45 mm long. The melt temperature was kept at 150° C. in the feed zone and increased to 260° C. by the time material reached the die. The extruder was starve fed with the first orifice ring pair left open. In the second stage, flow was restricted with the second orifice ring pair. A screw speed of 350 rpm was used, leading to an output of ten pounds per hour.

The samples prepared in the manner described above were first analyzed for base polymer degradation by measuring gel content as determined by hot tetrahydrofuran insolubles. This was accomplished by extraction with refluxing tetrahydrofuran. The soluble fraction of the sample was then recovered by precipitation of the extractant into isopropyl alcohol. This precipitation separated the unbound maleic anhydride from the base polymer. The precipitated polymer was then dried under vacuum to convert all functional groups to the anhydride form, as verified by infrared measurements. The maleic anhydride graft content of the soluble fraction of the samples was then measured by titration with potassium methoxide.

Table 1 shows the various reactant concentrations, examined, as well as analytical results for the materials prepared.

TABLE 1

Maleic Anhydride Extruder Grafted Block Copolymer

| Example | Wt. % Maleic Anhydride Added | Wt. % Lupersol 101 Added | Wt. % Maleic Anhydride Grafted Onto THF Solubles | Wt. % THF Insolubles |
|---|---|---|---|---|
| 1 | 3 | 0 | 0 | 0 |
| 2 | 3 | 0.01 | 0.2 | 8 |
| 3 | 3 | 0.1 | 1.8 | 2 |
| 4 | 5 | 0.5 | 4.6 | 2 |
| 5 | 3 | 1.0 | 2.2 | 40 |

In Example 1 maleic anhydride could not be grafted to the base polymer within the limits of detection of the analytical technique used without addition of a free-radical initiator. In Examples 2–4 a wide range of functionality levels were obtained by the free radical initiated melt grafting technique. In Example 5 severe base polymer degradation has taken place when too high a level of free radical initiator is used.

EXAMPLE 6

Extruder grafting conditions used were the same as for the above examples.

100 parts of 70/30 weight percent mixture of anionically polymerized ethylene butylene copolymer (140,000 M.W.) and anionically polymerized homopolystyrene (50,000 M.W.) were tumbled (dry blended) with 3 parts of maleic anhydride and 0.1 parts of Lupersol 101. This mixture was extruded under the previous grafting conditions.

A 10 gram sample of the extruded composition was dissolved in 200 ml chloroform and the solution was then added to 1200 ml of acetone to precipitate the EB copolymer component which was then recovered by filtrations and washing in acetone.

A sample of this EB copolymer component was then analyzed by infrared spectroscopy. The IR spectrum showed characteristic acid anhydride bands at between about $1700^{-cm}$ and $1800^{-cm}$ showing the presence of maleic anhydride bound to the EB copolymer component.

The polystyrene-chloroform-acetone mixture from the previous step was held under vacuum at 90° C. in a Roto Vap for 30 minutes to remove unbound (free) maleic anhydride and to concentrate the solution in preparation for casting an IR film sample. The sample was analyzed and showed essentially no presence of maleic anhydride. This result showed that there was no maleic anhydride bound the styrene component.

From the above experiments it can be concluded that the maleic anhydride is grafted to the EB (mid-block) component in the block copolymer.

EXAMPLE 7

Two S-EB-S block copolymers similar to Kraton G1652 were prepared having residual unsaturations of 0.170 and 0.098 milliequivalents of double bonds per gram. These copolymers were extruder grafted using the same extruder conditions as in the previous examples. Again 3.0 weight percent maleic anhydride and 0.1 weight percent of Lupersol 101 were used. Both extruded materials were analyzed as above for bound maleic anhydride by titration with potassium methoxide.

It was found that both samples contained 1.6 weight percent of maleic anhydride. Therefore, it can be concluded that the degree of residual unsaturation does not affect the graft reaction.

We know from Example 6 that grafting in occurring in the EB block. The EB block contains five possible classes of carbon atoms where grafting can occur; 1°, 2°, 3°, allylic and vinyl carbons. Allylic and vinyl carbons are associated with unsaturation. Example 7 showed that the level of residual unsaturation does not affect the graft reaction. Therefore it can be concluded that grafting is not occurring at these carbons.

It is well known the reactivity of the 1°, 2°, 3° carbons is related to the ease of formation of free radicals resulting from hydrogen abstraction and follows the relationship 3°>2°>1°. 1° carbons are not kenetically favored and occur infrequently. Since the 3° carbon is most favored kenetically to react and since the 2° carbons occur more frequently, substantially all of the grafting should occur at the 2° and 3° carbons.

What is claimed is:

1. A functionalized selectively hydrogenated block copolymer of the formula ABA to which has been grafted an acid compound or its derivative wherein,
    (1) each A is predominantly a polymerized monoalkenyl aromatic hydrocarbon block having an average molecular weight of about 2,000 to 115,000;
    (2) each B prior to hydrogenation is predominantly a polymerized conjugated diene hydrocarbon block having an average molecular weight of about 20,000 to 450,000;
    (3) the blocks A constituting 5–95 weight percent of the copolymer;
    (4) the unsaturation of the block B is less than 10% of the original unsaturation;
    (5) the unsaturation of the A blocks is above 50% of the original unsaturation;
    (6) and substantially all of the acid compounds or their derivatives are grafted to the block copolymer at secondary or tertiary carbon positions in the B blocks;
    (7) and wherein said acid compounds and their derivatives are not easily polymerizable.

2. A functionalized selectively hydrogenated block copolymer having at least 1 A mid block and at least two B end blocks to which has been grafted an acid compound or its derivative wherein,
    (1) each A is predominantly a polymerized monoalkenyl aromatic hydrocarbon block having an average molecular weight of about 2,000 to 115,000;
    (2) each B prior to hydrogenation is predominantly a polymerized conjugated diene hydrocarbon block having an average molecular weight of about 20,000 to 450,000;
    (3) the blocks A constituting 5–95 weight percent of the copolymer;
    (4) the unsaturation of the block B is less than 10% of the original unsaturation;
    (5) the unsaturation of the A blocks is above 50% of the original unsaturation;

(6) and substantially all of the acid compounds or their derivatives are grafted to the block copolymer at secondary or tertiary carbon positions in the B blocks.

3. The functionalized block copolymer of claim 1 wherein the block copolymer is a styrene-butadiene-styrene block copolymer.

4. The block copolymer of claim 1 wherein prior to hydrogenation, the polymeric blocks A are polymer blocks of a monoalkenyl aromatic hydrocarbon.

5. The block copolymer of claim 1 wherein the blocks A comprise 5–30 percent by weight of the copolymer, the unsaturation of block B is reduced to less than 5% of its original value and the average unsaturation of the hydrogenated block copolymer is reduced to less than 20% of its original value.

6. The block copolymer of claim 5 wherein A is a polymerized styrene block having an average molecular weight of between about 4,000 and 60,000.

7. The block copolymer of claim 6 wherein B is a polymerized butadiene block having an average molecular weight of between about 35,000 and 150,000, 35%–50% of the condensed butadiene units having 1,2-configuration.

8. The block copolymer of claim 7 wherein the unsaturation of block B has been reduced by hydrogenation to less than 10% of its original value.

9. A functionalized selectively hydrogenated block copolymer composition according to claim 1 wherein an average of less than about 10% of the monoalkenyl aromatic hydrocarbon units are hydrogenated.

10. A functionalized hydrogenated block copolymer composition according to claim 1 wherein an average of more than about 25% of the monoalkenyl aromatic hydrocarbon units are hydrogenated.

11. The functionalized hydrogenated block copolymer of claim 1 wherein the acid compound is maleic acid.

12. The functionalized hydrogenated block copolymer of claim 1 wherein the acid compound is carboxylic acid.

13. The functionalized hydrogenated block copolymer of claim 1 wherein the acid compound is sulfonic acid.

14. The functionalized hydrogenated block copolymer of claim 1 wherein the grafted acid compound or its derivative is present at between about 0.02–20 weight percent.

15. The functionalized hydrogenated block copolymer of claim 1 wherein the grafted acid compound or its derivative is present at between about 0.1–10 weight percent.

16. The functionalized hydrogenated block copolymer of claim 1 wherein the grafted acid compound or its derivative is present at between about 0.2–5 weight percent.

17. The functionalized block copolymer of claim 1 wherein the block copolymer is a styrene-butadiene-styrene block copolymer.

18. The block copolymer of claim 1 wherein prior to hydrogenation, the polymeric blocks A are polymer blocks of a monoalkenyl aromatic hydrocarbon.

19. The block copolymer of claim 1 wherein the blocks A comprise 5–30 percent by weight of the copolymer, the unsaturation of block B is reduced to less than 5% of its original value and the average unsaturation of the hydrogenated block copolymer is reduced to less than 20% of its original value.

20. The block copolymer of claim 18 wherein A is a polymerized styrene block having an average molecular weight of between about 4,000 and 60,000.

21. The block copolymer of claim 19 wherein B is a polymerized butadiene block having an average molecular weight of between about 35,000 and 150,000, 35%–50% of the condensed butadiene units having 1,2-configuration.

22. The block copolymer of claim 20 wherein the unsaturation of block B has been reduced by hydrogenation to less than 10% of its original value.

23. A functionalized selectively hydrogenated block copolymer composition according to claim 2 wherein an average of less than about 10% of the monoalkenyl aromatic hydrocarbon units are hydrogenated.

24. A functionalized hydrogenated block copolymer composition according to claim 2 wherein an average of more than about 25% of the monoalkenyl aromatic hydrocarbon units are hydrogenated.

25. The functionalized hydrogenated block copolymer of claim 2 wherein the acid compound is maleic acid.

26. The functionalized hydrogenated block copolymer of claim 2 wherein the acid compound is carboxylic acid.

27. The functionalized hydrogenated block copolymer of claim 2 wherein the acid compound is sulfonic acid.

28. The functionalized hydrogenated block copolymer of claim 2 wherein the grafted acid compound or its derivative is present at between about 0.02–20 weight percent.

29. The functionalized hydrogenated block copolymer of claim 2 wherein the grafted acid compound or its derivative is present at between about 0.1–10 weight percent.

30. The functionalized hydrogenated block copolymer of claim 2 wherein the grafted acid compound or its derivative is present at between about 0.2–5 weight percent.

* * * * *